(12) United States Patent
Townsend et al.

(10) Patent No.: US 9,783,284 B2
(45) Date of Patent: Oct. 10, 2017

(54) ROTARY DRIVE ASSEMBLY FOR WING TIP

(71) Applicant: THE BOEING COMPANY, Seal Beach, CA (US)

(72) Inventors: Keith Townsend, Everett, WA (US); Stephen J. Fox, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 45 days.

(21) Appl. No.: 14/282,595

(22) Filed: May 20, 2014

(65) Prior Publication Data
US 2015/0336657 A1    Nov. 26, 2015

(51) Int. Cl.
*B64C 3/56* (2006.01)

(52) U.S. Cl.
CPC .......... *B64C 3/56* (2013.01); *Y10T 29/49318* (2015.01)

(58) Field of Classification Search
CPC ........................................ B64C 3/56
USPC ......... 244/199.4, 124, 35 A, 35 R, 45 R, 91, 244/199.3, 198, 201
See application file for complete search history.

(56) References Cited

U.S. PATENT DOCUMENTS

| | | | |
|---|---|---|---|
| 2,418,301 A * | 4/1947 | Heal .......... | B64C 3/42 244/102 R |
| 2,468,425 A * | 4/1949 | Carpenter ........ | B64C 3/56 244/49 |
| 4,776,542 A * | 10/1988 | Van Dam ........ | B64C 3/10 244/198 |
| 6,260,799 B1 * | 7/2001 | Russ .......... | B64C 3/56 244/49 |
| 2014/0117150 A1 * | 5/2014 | Good .......... | B64C 3/56 244/49 |
| 2014/0117151 A1 * | 5/2014 | Fox ............ | B64C 23/065 244/49 |

FOREIGN PATENT DOCUMENTS

| | | | | |
|---|---|---|---|---|
| EP | 2727828 A2 | 5/2014 | | |
| GB | EP2727828 | * 2/2014 | ............... | B64C 3/56 |
| WO | 2011144298 A1 | 11/2011 | | |

OTHER PUBLICATIONS

Extended European Search Report for Application No. 15165343.3, Sep. 21, 2015, 9 pages.
Canada Office Action for related application 2,882,481 dated Mar. 3, 2016; 6 pp.

* cited by examiner

*Primary Examiner* — Justin Benedik
(74) *Attorney, Agent, or Firm* — Armstrong Teasdale LLP (57) ABSTRACT

A rotary drive assembly is provided. The assembly includes a tip hinge box, a body hinge box pivotably coupled to the tip hinge box, a rotary actuator positioned within the body hinge box, and a linkage mechanism coupled between the rotary actuator and the tip hinge box, the linkage mechanism including a first linkage fixedly coupled to the rotary actuator, and a second linkage coupled between the first linkage and the tip hinge box, wherein rotation of the rotary actuator causes the tip hinge box to rotate relative to the body hinge box.

15 Claims, 9 Drawing Sheets

ROTARY DRIVE ASSEMBLY FOR WING TIP

BACKGROUND

The field of the disclosure relates generally to wing assemblies, and, more particularly, to rotary drive assemblies for rotating a wing tip relative to a wing body.

The number of available airports that an aircraft is able to operate out of is typically limited, at least in part, by the size of the aircraft. Specifically, hanger and runway dimensions may prevent relatively large aircraft from operating out of smaller airports. For example, airports may be classified into different groups based on the permitted wingspans.

Accordingly, at least some known wing assemblies enable an aircraft to decrease its wingspan once the aircraft has landed, allowing to aircraft to operate out of smaller airports. For example, at least some known wing assemblies facilitate rotating a wing tip relatively to the remainder of the wing to shorten the overall length of the wing. However, known assemblies may include a direct drive system that places relatively large strains on the rotation mechanism. Further, known assemblies may require relatively large and/or complex components that may be too large to fit within the wing.

BRIEF DESCRIPTION

In one aspect a rotary drive assembly is provided. The assembly includes a tip hinge box, a body hinge box pivotably coupled to the tip hinge box, a rotary actuator positioned within the body hinge box, and a linkage mechanism coupled between the rotary actuator and the tip hinge box, the linkage mechanism including a first linkage fixedly coupled to the rotary actuator, and a second linkage coupled between the first linkage and the tip hinge box, wherein rotation of the rotary actuator causes the tip hinge box to rotate relative to the body hinge box.

In another aspect, a wing assembly for an aircraft is provided. The wing assembly includes a wing body, a wing tip, and a rotary drive assembly coupling the wing body to the wing tip such that the wing tip is rotatable with respect to the wing body. The rotary drive assembly includes a tip hinge box extending from the wing tip, a body hinge box extending from the wing body and pivotably coupled to the tip hinge box, a rotary actuator positioned within the body hinge box, and a linkage mechanism coupled between the rotary actuator and the tip hinge box, said linkage mechanism including a first linkage fixedly coupled to the rotary actuator, and a second linkage coupled between the first linkage and the tip hinge box, wherein rotation of the rotary actuator causes the wing tip to rotate relative to the wing body.

In yet another aspect a method of assembling a rotary drive assembly configured to rotate a wing tip relative to a wing body is provided. The method includes coupling a body hinge box extending from the wing body to a tip hinge box extending from the wing tip, positioning a rotary actuator within the body hinge box, and coupling a linkage mechanism between the rotary actuator and the tip hinge box, the linkage mechanism including a first linkage fixedly coupled to the rotary actuator and a second linkage coupled between the first linkage and the tip hinge box such that rotation of the rotary actuator causes the tip hinge box to rotate relative to the body hinge box.

DETAILED DESCRIPTION

The systems and methods described herein provide a rotary drive assembly for a wing tip. The assembly includes a body hinge box coupled to a tip hinge box. A rotary actuator rotates the tip hinge box via a linkage mechanism. Notably, the linkage mechanism provides a mechanical advantage, putting less stress on the rotary actuator and facilitating the use of a relatively small rotary actuator.

Figure 1:
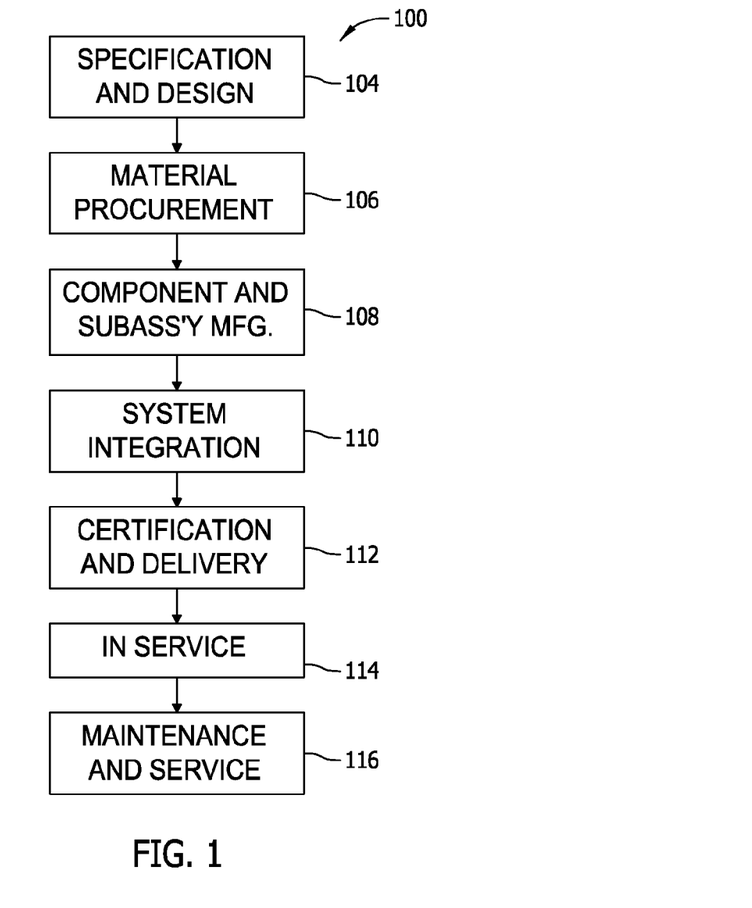
FIG. 1 is a flow diagram of an exemplary aircraft production and service methodology.
Figure 2:
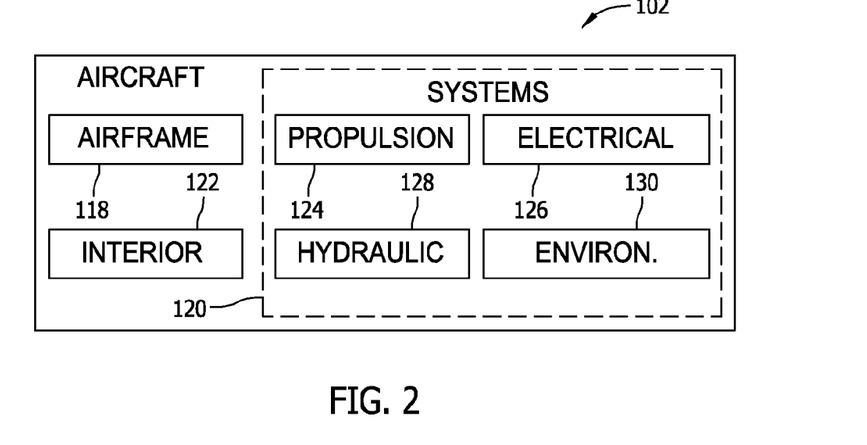
FIG. 2 is a block diagram of an aircraft.

Referring more particularly to the drawings, implementations of the disclosure may be described in the context of an aircraft manufacturing and service method 100 as shown in FIG. 1 and an aircraft 102 as shown in FIG. 2. During pre-production, exemplary method 100 may include specification and design 104 of aircraft 102 and material procurement 106. During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatuses and methods implemented herein may be employed during any one or more of the stages of production and service method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during production stages 108 and 110, for example, by substantially expediting assembly of or reducing the cost of aircraft 102. Similarly, one or more of apparatus implementations, method implementations, or a combination thereof may be utilized while the aircraft 102 is in service, for example and without limitation, to maintenance and service 116.

Figure 3:
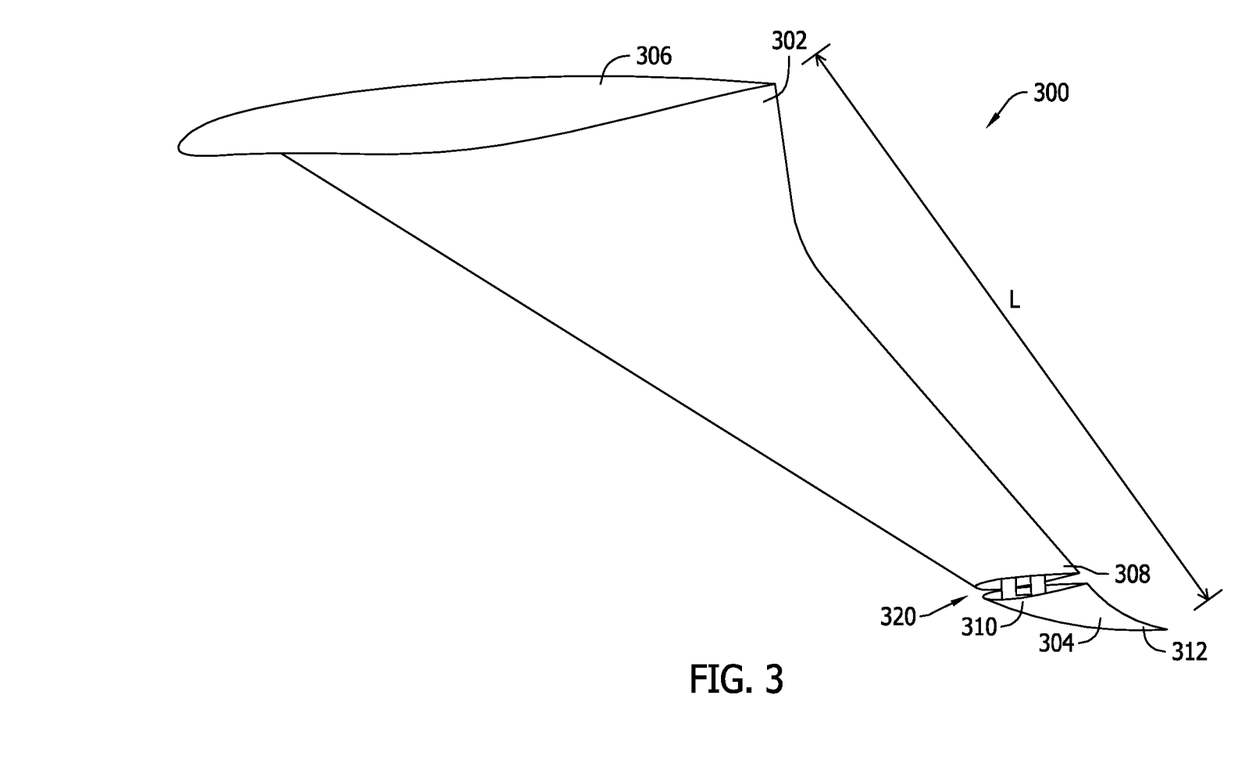
FIG. 3 is a perspective view of a wing assembly that may be used with the aircraft shown in FIG. 2.

FIG. 3 is a perspective view of an exemplary wing assembly 300 that includes a wing body 302 and a wing tip 304. Wing assembly 300 may be included, for example, on aircraft 102 (shown in FIG. 2). Wing body 302 extends from a first end 306 to a second end 308, and wing tip extends from a first end 310 to a second end 312. Wing body second end 308 is rotatably coupled to wing tip first end 310 using a rotary drive assembly 320, as described in detail. More specifically, wing tip 304 is selectively rotatable between a first position (shown in FIG. 3), in which wing tip 304 is oriented substantially parallel to wing body 302, and a second position, in which wing tip 304 is oriented upright and substantially orthogonal to wing body 302.

Accordingly, by rotating wing tip 304 from the first position to the second position, an overall length, L, of wing assembly 300 is reduced. During flight, wing tip 304 is fixed in the first position. However, once aircraft 102 lands, wing tip 304 may be switched to the second position. Thus, the overall profile of aircraft 102 can be reduced during ground maneuvers (e.g., taxiing, parking, etc.). Accordingly, because the profile of aircraft 102 is reducible upon landing, aircraft 102 may be certified to operate out of smaller airports (e.g., airports that aircraft 102 would be too large to operate out of without rotating wing tip 304).

Figure 4:
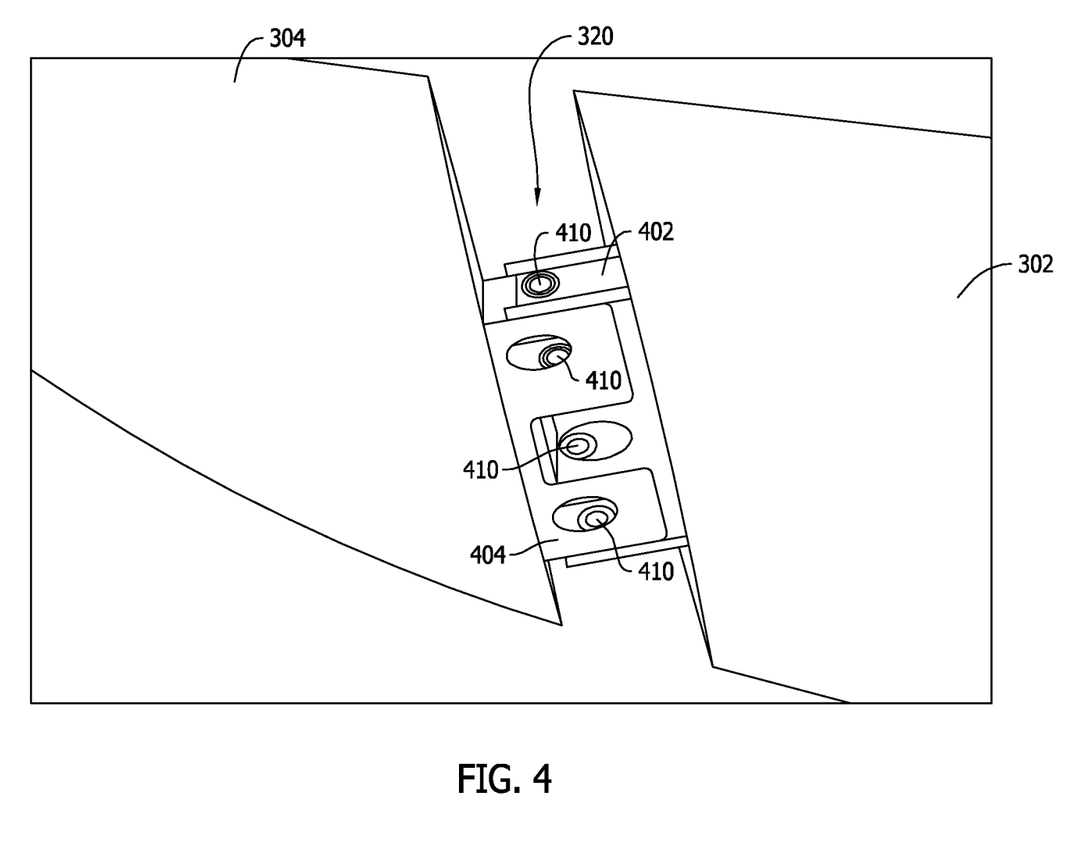
FIGS. 4-6 are perspective views of an exemplary rotary drive assembly that may be used with the wing assembly shown in FIG. 3.
Figure 5:
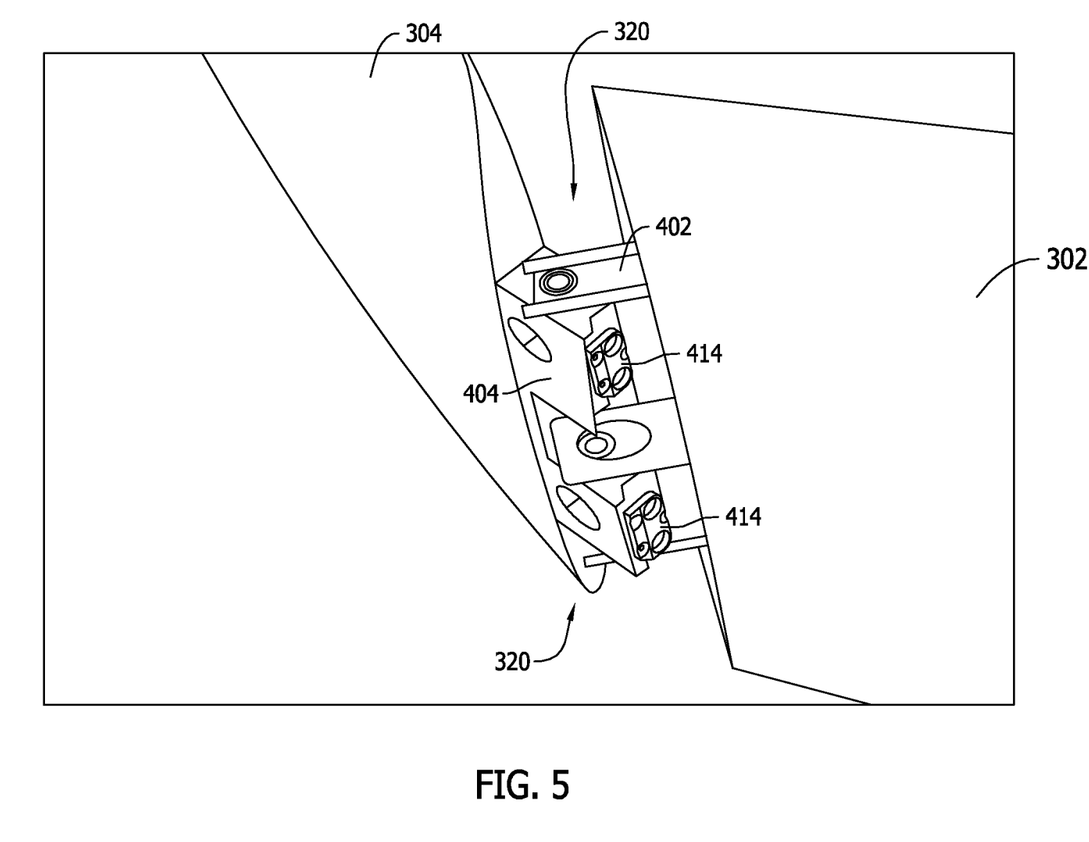
Figure 6:
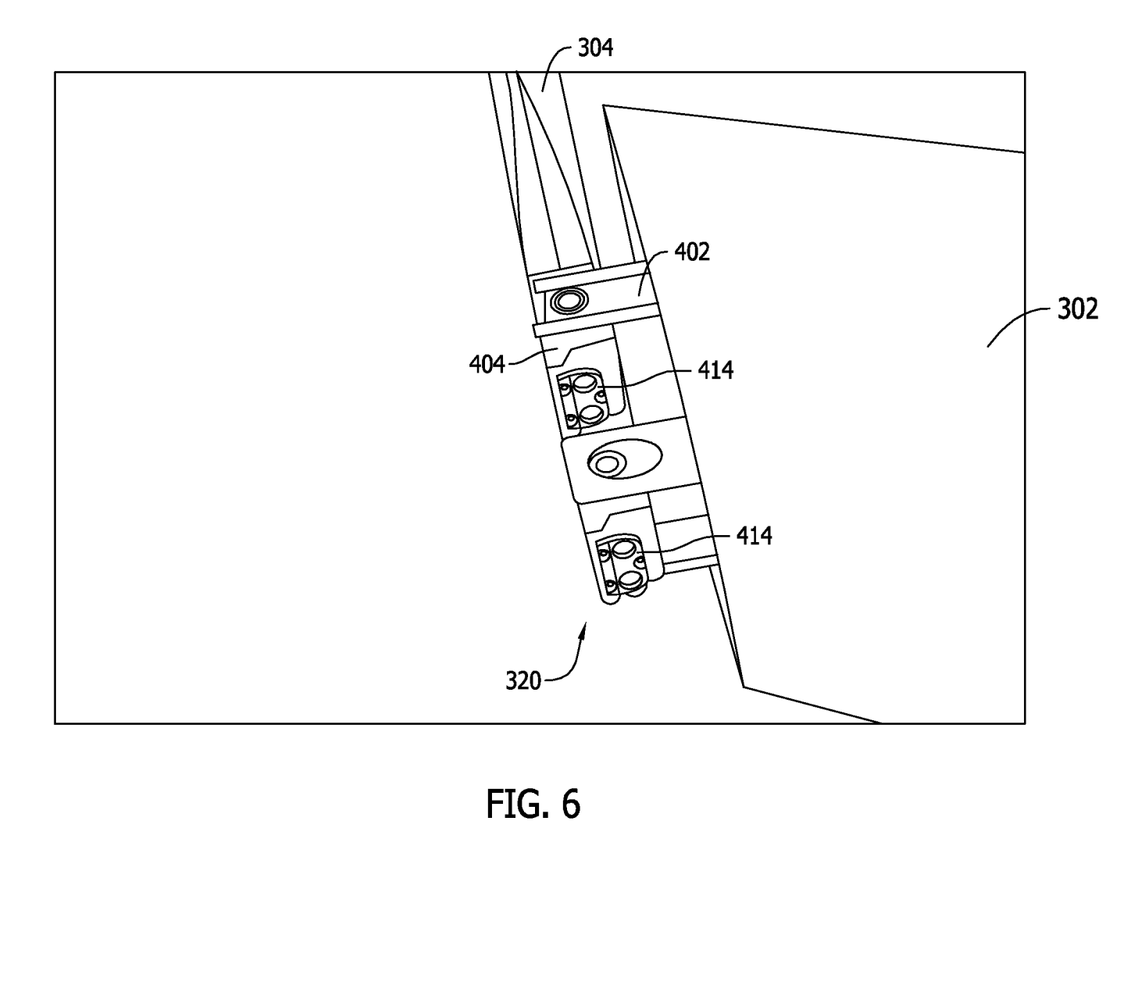

FIGS. 4-6 are perspective views of rotary drive assembly 320. In the exemplary implementation, rotary drive assembly 320 includes a body hinge box 402 that extends from wing body 302 and a tip hinge box 404 that extends from wing tip 304. As shown in FIG. 4, body hinge box 402 is coupled to tip hinge box 404 in an interlocking relationship. Specifically, in the exemplary implementation body hinge box 402 is coupled to tip hinge box 404 using bushings 410. Each bushing 410 extends through apertures formed in body hinge box 402 and tip hinge box 404. Alternatively, body hinge box 402 may be coupled to tip hinge box 404 using any connection mechanism(s) that enables rotary drive assembly 320 to function as described herein. A skin (not shown) of aircraft 102 covers components of rotary drive assembly 320 to protect rotary drive assembly 320.

To rotate wing tip 304 between first and second positions, body hinge box 402 rotates with respect to tip hinge box 404, as described herein. In FIG. 4, wing tip 304 is in the first position, in FIG. 5, wing tip 304 is in an intermediate position between the first and second positions, and in FIG. 6, wing tip 304 is in the second position.

As seen best in FIGS. 5 and 6, in the exemplary implementation, a pair of fittings 414 are coupled to tip hinge box 404. Each fitting 414 includes two apertures 416 defined therein. When wing tip 304 is placed in the first position, four latch pins (not shown) extend from wing body 302 and are received in respective apertures 416, locking wing tip 304 in the first position.

Figure 7:
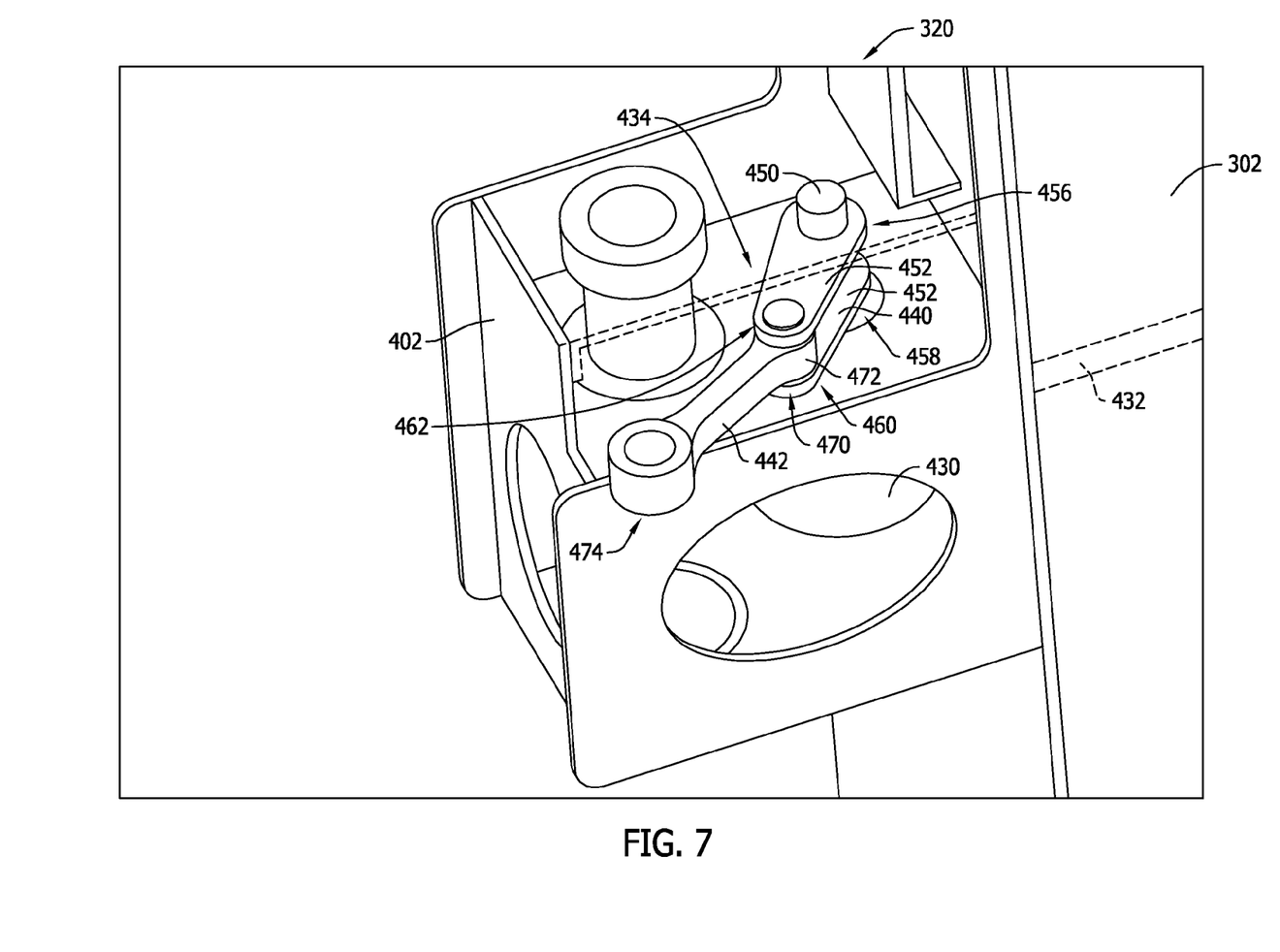
FIG. 7 is a perspective partial cut-away view of the rotary drive assembly shown in FIG. 4.

FIG. 7 is a perspective partial cut-away view of rotary drive assembly 320. Further, in FIG. 7, wing tip 304 and tip hinge box 404 have been removed for clarity. As shown in FIG. 7, rotary drive assembly 320 includes a rotary actuator 430 housed within body hinge box 402. In the exemplary implementation, rotary actuator 430 is a geared rotary actuator (GRA). Alternatively, rotary actuator 430 may be any type of actuator that enables rotary drive assembly 320 to function as described herein.

Rotary actuator 430 enables rotary drive assembly 320 to move wing tip 304 between the first and second positions. Specifically, a drive shaft 432 extends into wing body 302 and is coupled to rotary actuator 430. Further, a linkage mechanism 434 is coupled between rotary actuator 430 and tip hinge box 404. When drive shaft 432 drives rotary actuator 430, rotary actuator 430 rotates linkage mechanism 434, rotating tip hinge box 404, and accordingly, wing tip 304.

In the exemplary implementation, linkage mechanism 434 includes a first linkage 440 and a second linkage 442. First linkage 440 is fixedly coupled to rotary actuator 430 such that first linkage 440 rotates when rotary actuator 430 rotates. In the exemplary implementation, as shown in FIG. 7, first linkage 440 includes a pin 450 that extends between two parallel arms 452 at a first end 456 of first linkage 440. Pin 450 is coupled to rotary actuator 430 also extends into an aperture 458 formed in body hinge box 402. Pin 450 rotates freely within aperture 458 such that first linkage 440 rotates with respect to body hinge box 402. Alternatively, first linkage 440 may have any configuration that enables rotary drive assembly 320 to function as described herein.

A first end 470 of second linkage 442 is rotatably coupled to a second end 460 of first linkage 440. Specifically, second linkage 442 includes a pin 472 that is received in apertures 462 formed in arms 452 of first linkage 440. Pin 472 rotates freely within apertures 462 such that second linkage 442 rotates with respect to first linkage 440. A second end 474 of second linkage 442 is rotatably coupled to tip hinge box 404, such that tip hinge box 404 rotates when second linkage 442 rotates.

Figure 8:
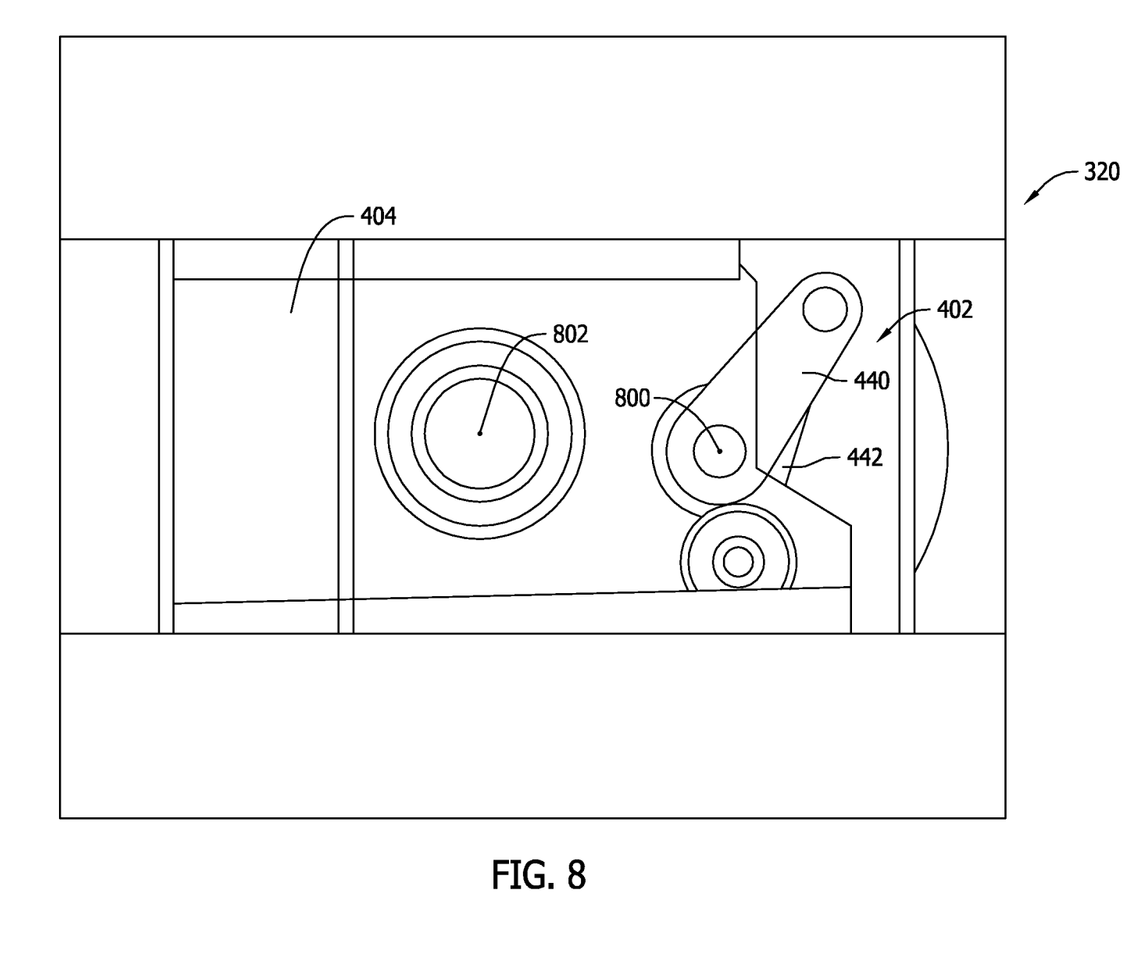
FIGS. 8-10 are side views of the rotary drive assembly shown in FIG. 4.
Figure 9:
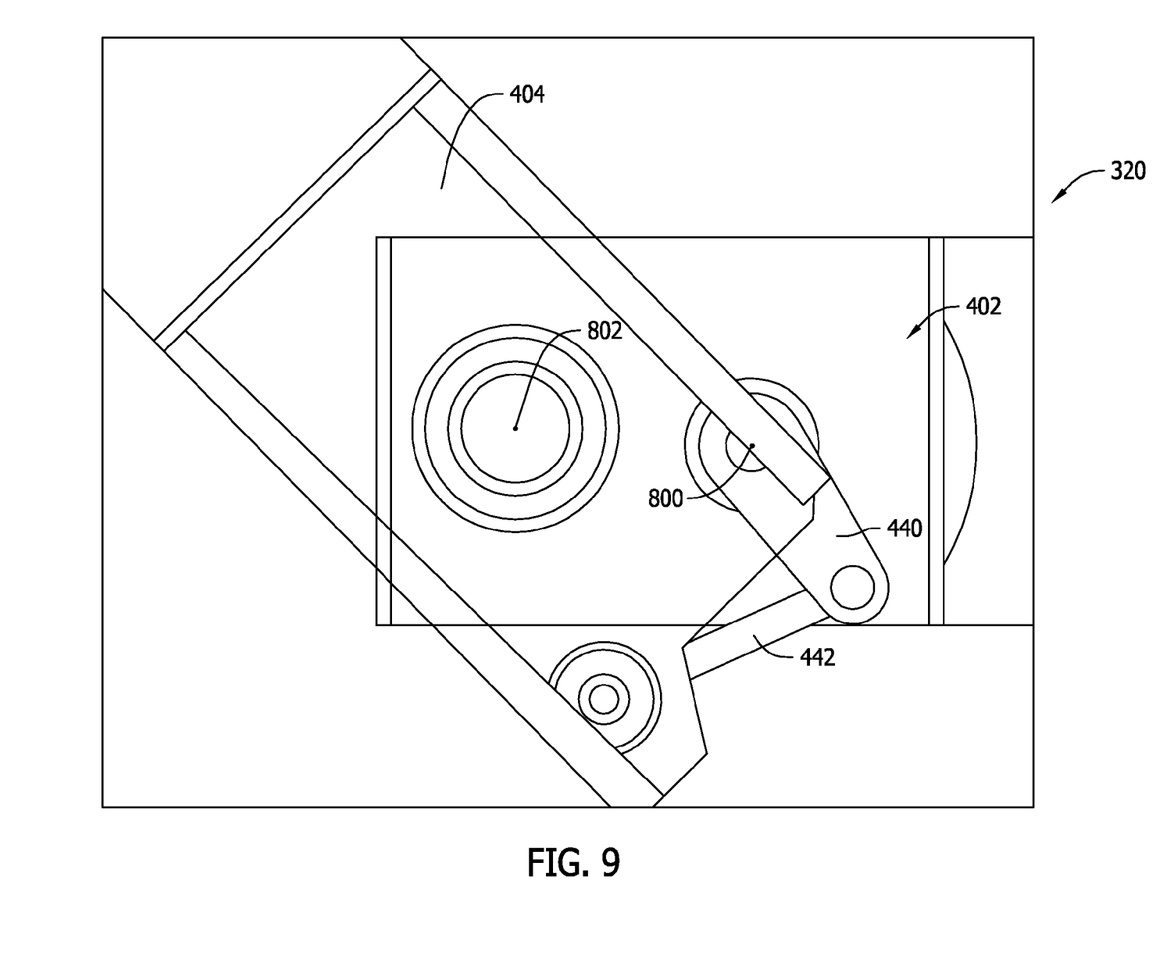
Figure 10:
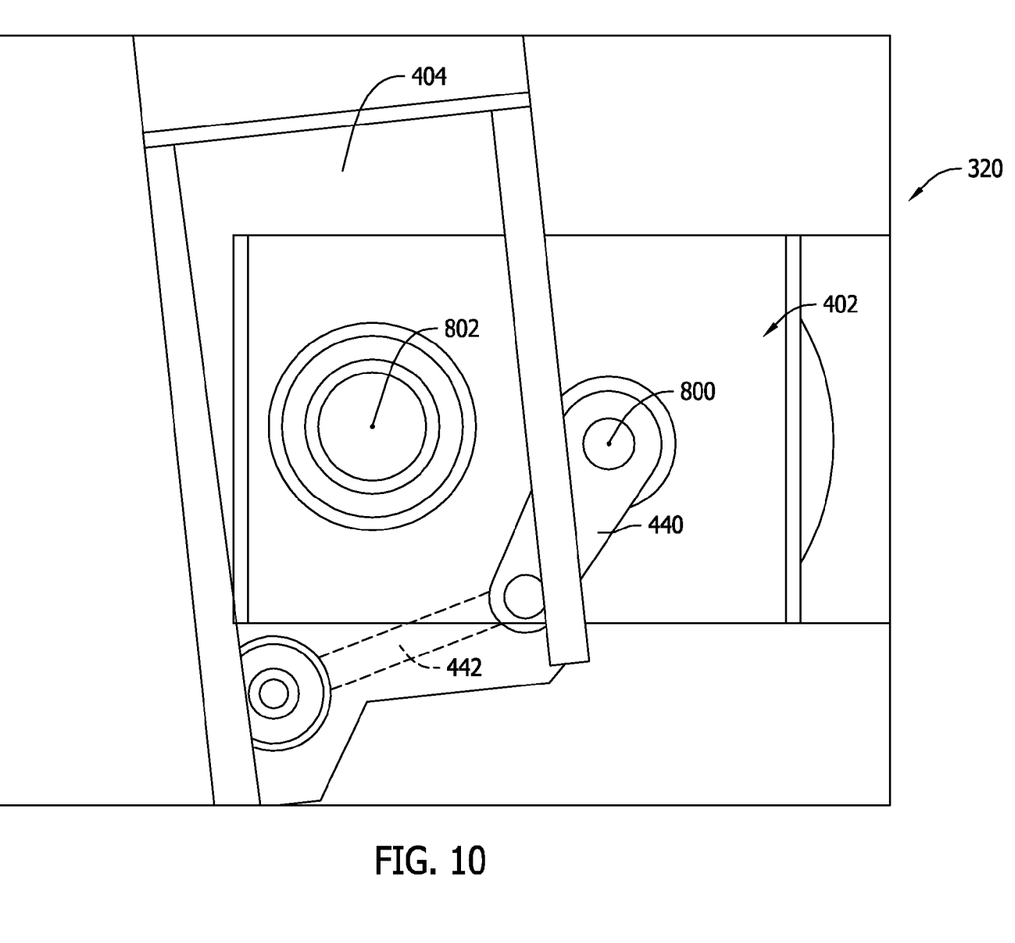

FIGS. 8-10 are side views of rotary drive assembly 320. In FIG. 8, tip hinge box 404 is in the first position (corresponding to FIG. 4), in FIG. 9, tip hinge box 404 is in the intermediate position between the first and second positions (corresponding to FIG. 5), and in FIG. 10, tip hinge box 404 is in the second position (corresponding to FIG. 6).

As shown in FIGS. 8-10, rotating first linkage 440 with respect to body hinge box 402 causes tip hinge box 404 to rotate with respect to body hinge box 402. Specifically, first linkage 440 rotates, causing second linkage 442, which in turn causes tip hinge box 404 to rotate.

As shown in FIG. 8, rotary actuator 430 rotates about a first axis 800, and tip hinge box 404 rotates with respect to body hinge box 402 about a second axis 802. Notably, first axis 800 is offset with respect to second axis 802. Accordingly, rotary drive assembly 320 provides a mechanical advantage. For example, in one implementation for every 160 degrees that rotary actuator 430 rotates, tip hinge box 404, and consequently, tip 304, rotates 80 degrees. This requires less force from rotary actuator 430 than if rotary actuator 430 operated on second axis 802 to directly rotate tip 402. Accordingly, rotary actuator 430 may be smaller than a direct-drive rotary actuator, which enables rotary actuator 430 to fit within body hinge box 402.

The implementations described herein provide a rotary drive assembly for a wing tip. The assembly includes a body hinge box coupled to a tip hinge box. A rotary actuator rotates the tip hinge box via a linkage mechanism. Notably, the linkage mechanism provides a mechanical advantage, putting less stress on the rotary actuator and facilitating the use of a relatively small rotary actuator.

The implementations described herein provide improvements over at least some known wing assemblies. As compared to at least some known wing assemblies, the rotary drive assembly described herein includes a configuration that provides a mechanical advantage for a rotary actuator. Accordingly, while at least some known wing assemblies utilize a direct drive configuration (i.e., with little or no mechanical advantage), the systems and methods described herein facilitate reducing strain on the rotary actuator. Further, because of the linkage mechanism described herein, the size of the rotary actuator can be reduced, as compared to at least some known wing assemblies.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotary drive assembly comprising:
   a wing tip hinge box configured to be coupled to a wing tip;
   a wing body hinge box configured to be coupled to a wing body, said wing body hinge box coupled to said wing tip hinge box in an interlocking connection using a plurality of bushings that extend through apertures formed in said wing tip hinge box and said wing body hinge box, the plurality of bushings enabling said wing tip hinge box to pivot relative to said wing body hinge box;
   a rotary actuator positioned within said wing body hinge box, said rotary actuator configured to rotate about a first axis;
   a linkage mechanism coupled between said rotary actuator and said wing tip hinge box, said linkage mechanism comprising:
     a first linkage comprising first and second ends, said first end fixedly coupled to said rotary actuator and configured to rotate about the first axis; and
     a second linkage comprising first and second ends, said first end coupled to said second end of said first linkage and said second end coupled to said wing tip hinge box, wherein rotation of said rotary actuator causes said wing tip hinge box to rotate relative to said wing body hinge box; and
   a pair of fittings coupled to said wing tip hinge box, each fitting having a plurality of holes defined therethrough and configured to receive latch pins extending from said wing body that lock said wing tip hinge box in a first position.

2. A rotary drive assembly in accordance with claim 1, wherein said wing tip hinge box is configured to rotate relative to said wing body hinge box about a second axis that is offset from the first axis.

3. A rotary drive assembly in accordance with claim 1, wherein said wing tip hinge box is rotatable between a first position and a second position, wherein said wing tip hinge box is oriented substantially parallel to said wing body hinge box in the first position, and wherein said wing tip hinge box is oriented substantially orthogonal to said wing body hinge box in the second position.

4. A rotary drive assembly in accordance with claim 1, wherein rotation of said rotary actuator through a first angle causes said wing tip hinge box to rotate through a second angle that is half of the first angle.

5. A rotary drive assembly in accordance with claim 1, wherein said rotary actuator comprises a geared rotary actuator.

6. A wing assembly for an aircraft, said wing assembly comprising:
   a wing body;
   a wing tip; and
   a rotary drive assembly coupling said wing body to said wing tip such that said wing tip is rotatable with respect to said wing body, said rotary drive assembly comprising:
     a tip hinge box extending from said wing tip;
     a body hinge box extending from said wing body and coupled to said tip hinge box in an interlocking connection using a plurality of bushings that extend through apertures formed in said tip hinge box and said body hinge box, the plurality of bushings enabling said tip hinge box to pivot relative to said body hinge box;
     a rotary actuator positioned within said body hinge box, said rotary actuator configured to rotate about a first axis;
     a linkage mechanism coupled between said rotary actuator and said tip hinge box, said linkage mechanism comprising:
       a first linkage comprising first and second ends, said first end fixedly coupled to said rotary actuator and configured to rotate about the first axis; and
       a second linkage comprising first and second ends, said first end coupled to said second end of said first linkage and said second end coupled to said tip hinge box, wherein rotation of said rotary actuator causes said wing tip to rotate relative to said wing body; and
     a pair of fittings coupled to said wing tip hinge box, each fitting having a plurality of holes defined therethrough and configured to receive latch pins extending from said wing body that lock said wing tip hinge box in a first position.

7. A wing assembly in accordance with claim 6, wherein said wing tip is configured to rotate relative to said wing body about a second axis that is offset from the first axis.

8. A wing assembly in accordance with claim 6, wherein said wing tip is rotatable between a first position and a second position, wherein said wing tip is oriented substantially parallel to said wing body in the first position, and wherein said wing tip is oriented substantially orthogonal to said wing body in the second position.

9. A wing assembly in accordance with claim 6, wherein rotation of said rotary actuator through a first angle causes said wing tip to rotate through a second angle that is half of the first angle.

10. A wing assembly in accordance with claim 6, wherein said rotary actuator comprises a geared rotary actuator.

11. A method of assembling a rotary drive assembly configured to rotate a wing tip relative to a wing body, said method comprising:
    coupling a wing body hinge box extending from the wing body to a wing tip hinge box extending from the wing tip in an interlocking connection using a plurality of bushings that extend through apertures formed in the wing tip hinge box and the wing body hinge box, the plurality of bushings enabling the wing tip hinge box to pivot relative to the wing body hinge box;
    positioning a rotary actuator within the wing body hinge box, the rotary actuator configured to rotate about a first axis;
    coupling a linkage mechanism between the rotary actuator and the wing tip hinge box, the linkage mechanism including a first linkage having first and second ends, the first end fixedly coupled to the rotary actuator and configured to rotate about the first axis, and a second linkage having first and second ends, the first end coupled to the second end of the first linkage and the second end coupled to the wing tip hinge box such that rotation of the rotary actuator causes the wing tip hinge box to rotate relative to the wing body hinge box; and coupling a pair of fittings to the wing tip hinge box, each fitting having a plurality of holes defined therethrough and configured to receive latch pins extending from the wing body that lock the wing tip hinge box in a first position.

12. A method in accordance with claim 11, further comprising rotating the rotary actuator to rotate the wing tip between a first position and a second position, wherein the wing tip is oriented substantially parallel to the wing body in the first position, and wherein the wing tip is oriented substantially orthogonal to the wing body in the second position.

13. A method in accordance with claim 12, wherein rotating the rotary actuator comprises rotating the rotary actuator about the first axis such that the wing tip rotates relative to the wing body about a second axis that is offset from the first axis.

14. A method in accordance with claim 12, wherein rotating the rotary actuator comprises rotating the rotary actuator through a first angle such that the wing tip rotates through a second angle that is half of the first angle.

15. A method in accordance with claim 11, wherein positioning a rotary actuator comprises positioning a geared rotary actuator within the wing body hinge box.

* * * * *